W. N. Whiteley.
Harvester.
N° 80258      Patented Jul. 21, 1868
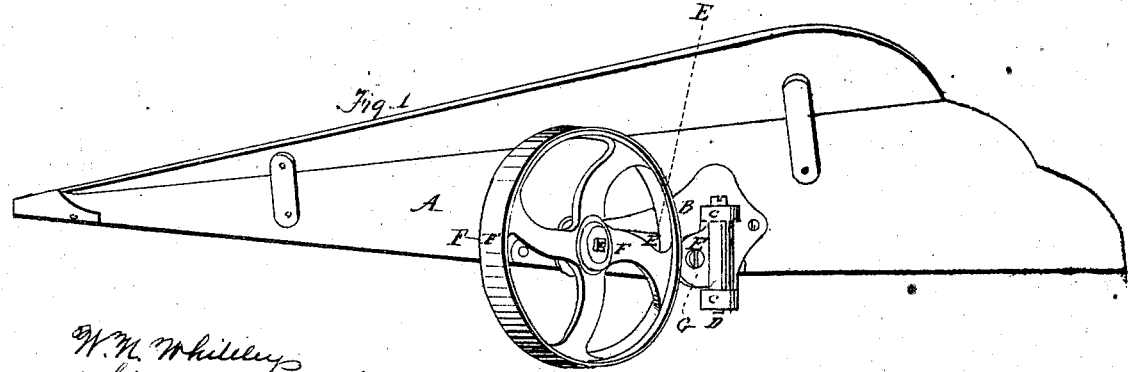
W. N. Whiteley
By his atty R. D. O. Smith
R. S. Turner
Wm. J. Browne
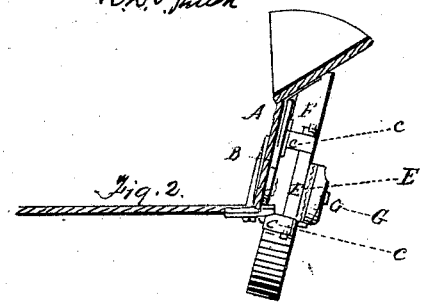
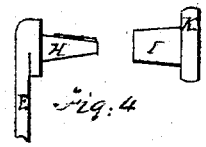
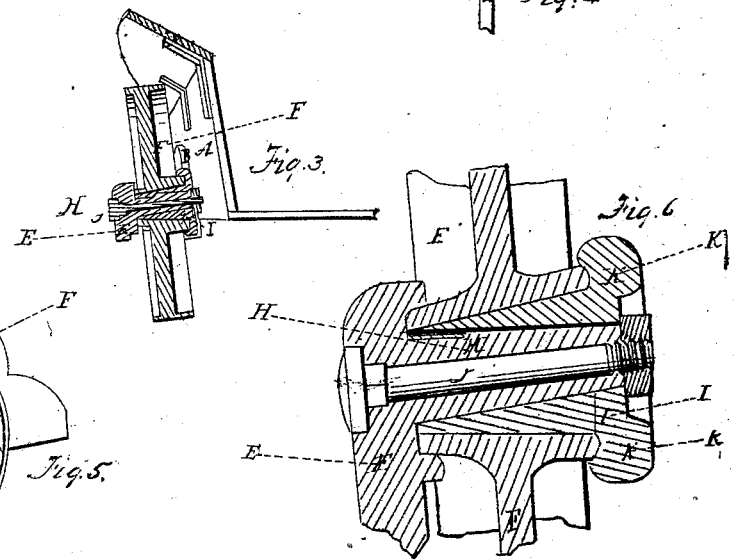

United States Patent Office.

WILLIAM N. WHITELEY, OF SPRINGFIELD, OHIO.

Letters Patent No. 80,258, dated July 21, 1868.

IMPROVEMENT IN HARVESTERS.

*The Schedule referred to in these Letters Patent and making part of the same.*

TO ALL WHOM IT MAY CONCERN:

Be it known that I, WILLIAM N. WHITELEY, of Springfield, in the county of Clark, and State of Ohio, have invented a new and useful Improvement in Mounting Harvesters' Grain-Wheels; and I do hereby declare the following to be a full, clear, and exact description of the same, reference being had to the accompanying drawings, in which—

Figure 1 is a side elevation of the divider of a harvesting-machine, with the grain-wheel turned forward.

Figure 2 is a front elevation of grain-wheel.

Figure 3 is a vertical cross-section of said wheel and the divider.

Figure 4 is a side elevation of the stud which forms the axle of the grain-wheel.

Figure 5 is a side elevation of the sleeve interposed between the stud and hub of the wheel.

Figure 6 is an enlarged section through the axle of the grain-wheel, showing the chilled surfaces, &c.

In reaping-machines, the "divider," which separates the grain to be cut from that to be left standing, is set with its point extending forward and sideways far enough to include the line of the tread of the grain-wheel, so that said wheel shall run upon the stubble, and not upon the uncut grain; and in order to reduce as much as possible this outward deflection of the point of the divider, the grain-wheel is arranged so as to approach the edge of the platform as closely as possible, and also to stand "dishing," or with its axis inclined, so that the tread will be further inward than the top of the wheel.

To permit the wheel to approach closely to the edge of the platform, it is necessary to place its connecting-arm on the outer side of said wheel; and a wheel set with an inclined axis would, if the axle were straight, constantly tend toward one or the other end thereof, and thus greatly increase the friction and power to be applied. And this defect is only to be remedied by employing a tapered axle, the lowermost line of which shall be level, so as to present no inducement for the wheel to run to the one end or the other.

My invention, then, consists, first, in constructing the axle or spindle on which the grain-wheel runs, so that the diameter of its bearing-surface shall decrease toward the arm from which said spindle or axle projects; and second, in the manner of constructing said axle so as to secure the desired advantages.

That others may understand the construction and operation of my invention, I will particularly describe it.

A is the divider, and B is a flange or plate, attached to the outer shoe and divider in some suitable manner. Two lugs, C C, project from the upper and lower edges of the plate B, and the joint-bolt D passes through both of said lugs, and through the jointed arm E, at the outer end of which the grain-wheel F is mounted.

The arm E is made in two parts, joined by a joint-bolt, G, and the parts of the arm which are in contact around the bolt G are radially serrated, so that the two parts of the arm may be adjusted in relation to each other, so as to secure a vertical adjustment of the grain-wheel, to carry the outer shoe at any desired height from the ground.

The arm E and grain-wheel F have a horizontal motion on the bolt D, and the wheel therefore acts like a caster-wheel, and follows its point of attachment to the outer end of the cutting-apparatus through all of its movements. When the machine is backed for any purpose, the wheel F assumes the position shown in fig. 1, and still follows in the rear of the movement of the outer shoe.

At the outer end of the arm E is a spindle or axis, H, made tapering from base to point, as shown in fig. 4, and fitted upon said spindle is a hollow tapered sleeve, I, the smaller end of which fits the base of the spindle, so that when the sleeve I is in position on said spindle, its smaller end is toward the arm E. A spline and feather prevents the sleeve I from turning on the spindle, and a screw-bolt, J, binds the sleeve firmly in its place on the spindle, all of which is shown in fig. 3.

The grain-wheel F is cast with a tapered hole through its hub, and said taper is exactly fitted to the tapered sleeve I, the outer surface of which forms the bearing upon which the wheel runs; and as the wheel stands inclined, as shown in figs. 2 and 3, when moving forward, it is necessary that the lower or bearing-surface of the sleeve I should be level, or parallel with the surface of the platform, so that the wheel shall have no tendency to run off its axle.

This principle is well understood by wagon-makers, who always employ tapered axles, but always set them with the lower side level.

At the larger end of the sleeve I is the flange K, which encloses the end of the hub of the wheel F, and prevents access of dirt, and other extraneous matters from gaining access to the frictional surfaces, and, as a washer, effectually retains the wheel in place.

The grain-wheel is cast around a chill, so that the inner surface of the hub shall be exceedingly hard, and the sleeve I is cast in a chill-mould, so as to make its outer surface likewise exceedingly hard, and these two hardened surfaces will run together without lubrication, with less friction and detriment than when the frictional surfaces are less hard, or constructed in any different manner.

Having described my invention, what I claim as new is—

1. The loose sleeve I, in combination with spindle H, fastened permanently to the arm E, substantially as and for the purpose set forth.

2. Reversing the taper of the bearing of the grain-wheel, substantially as herein described, so that, while the arm which supports the wheel is on the outer side of said wheel, the large end of the bearing on which the wheel turns will be next to the divider.

3. The sleeve I, made with a chambered head, K, which will partially enclose one end of the hub, to retain the same in place, and to exclude dust and dirt from the frictional surfaces, in connection with a corresponding chamber made in the arm E or spindle H, to enclose the other end of the hub.

WM. N. WHITELEY.

Witnesses:
   Geo. W. Benns,
   D. P. Jefferies.